United States Patent [19]

Arendt

[11] 4,242,426

[45] Dec. 30, 1980

[54] PROCESS FOR ELECTROLYTE STRUCTURE WITH STRONTIUM TITANATE MATRIX FOR MOLTEN CARBONATE FUEL CELLS

[75] Inventor: Ronald H. Arendt, Schenectady, N.Y.

[73] Assignee: General Electric Company, Schenectady, N.Y.

[21] Appl. No.: 90,880

[22] Filed: Nov. 5, 1979

[51] Int. Cl.$^3$ .............................................. H01M 6/18
[52] U.S. Cl. .................................... 429/193; 29/623.5
[58] Field of Search ................... 429/193, 188, 46, 16; 264/104, 109, 125, 319, 340; 252/62.2, 62.3; 29/623.1, 623.5

[56] References Cited

U.S. PATENT DOCUMENTS

| | | | |
|---|---|---|---|
| 3,466,197 | 9/1969 | Bawa | 429/46 |
| 3,970,474 | 7/1976 | Onbar | 429/188 X |
| 3,998,939 | 12/1976 | Mason et al. | 429/193 X |
| 4,009,321 | 2/1977 | Baker et al. | 429/46 |
| 4,079,171 | 3/1978 | Marianouski | 429/46 |
| 4,115,632 | 9/1978 | Kinoshita | 429/188 |

*Primary Examiner*—Charles F. LeFevour
*Attorney, Agent, or Firm*—Jane M. Binkowski; James C. Davis, Jr.; Leo I. MaLossi

[57] ABSTRACT

An electrolyte structure is produced composed of an electrolyte and a matrix of strontium titanate.

3 Claims, No Drawings

PROCESS FOR ELECTROLYTE STRUCTURE WITH STRONTIUM TITANATE MATRIX FOR MOLTEN CARBONATE FUEL CELLS

The Government of the United States of America has rights in this invention pursuant to Department of Energy Contract No. EC-77-C-03-1479.

The present invention relates to an electrolyte structure for use in molten carbonate fuel cells and to methods of preparing such a structure.

Generally, molten carbonate fuel cells are comprised of a cathode, an anode, and an electrolyte structure disposed between the cathode and anode. The electrolyte structure is composed of carbonate electrolyte and a supporting matrix. Under fuel cell operating conditions, at temperatures usually in the range of about 500° C. to 700° C., the supporting matrix acts to retain, via capillary action, the electrically active molten carbonate between the cell electrodes, thereby alleviating the need to physically anchor the electrodes as rigidly as would be required with a pure liquid electrolyte system.

One particular problem of molten carbonate fuel cells is the small crystallite sized inorganic material used to matrix the molten electrolyte in the electrolyte structures. The currently used material, $LiAlO_2$, is unsatisfactory in that it exhibits appreciably crystallite growth under cell operating conditions over time periods that are a small fraction of the lifetimes required for commercial viability of the fuel cell system. The growth of these matrix crystallites results in changes in the matrix pore volume and pore size distribution, which must bear a particular, and suitable, relation to those of the fuel cell electrodes, so as to preclude satisfactory operation of the cell after relatively short periods of time.

The growth of the matrix crystallites, in fact any material in this application, is driven by the thermodynamic criterion to minimize the total system free energy by minimization of surface area. The situation is particularly acute with $LiAlO_2$ in that there are three crystallographic structures possible for this material. Further, these three structures have different physical densities. The pore volume and pore size distribution is therefore dependent on which structure is present. This variation, in turn, affects the match with the corresponding electrode characteristics and thus fuel cell performance. It has been observed experimentally that the fuel cell operating conditions can greatly affect the stability of the crystallographic modifications of $LiAlO_2$, leading to the predominance of one or another crystal structure at different times in the life of a cell. This variation in crystal structure of the $LiAlO_2$ with cell operating conditions is postulated to be a "catalytic" mechanism which enhances the rate of crystal growth over that which might be expected if only one crystal structure were possible.

The solution to the crystal structure problem is to substitute an entirely different material for the $LiAlO_2$. The requirements of any new material are that it not enter into any reactions with the molten $Li_2CO_3$-$K_2CO_3$ electrolyte, of which the $Li_2CO_3$ component is most active. Since the fuel cell environment contains $CO_2$, an acidic species in terms of its molten salt chemistry, any binary cationic oxide compound used as an electrolyte matrix must satisfy several criteria. Firstly, it must be a solid at the temperatures of interest, having only one stable crystal structure, and possess an insignificant, virtually zero, solubility in the molten electrolyte. More importantly, the candidate must not enter into metathetical reactions with the electrolyte. That is, $Li_2CO_3$, $K_2CO_3$ and the candidate must be far more stable than any of their potential interaction products. Strontium titanate satisfies these criteria and has been determined experimentally to be a satisfactory matrix material candidate.

Briefly stated, the present invention consists essentially of an improved molten carbonate fuel cell electrolyte structure comprising, based on the total weight of the electrolyte structure, about 55% by weight to about 75% by weight of strontium titanate and about 25% by weight to about 45% by weight of alkali metal carbonates electrolyte, said strontium titanate having a crystallite structure which is at least substantially spherical and which has an average size ranging from about 0.1 micron to about 1 micron, said strontium titanate being selected from the group consisting of stoichiometric strontium titanate, strontium-rich titanate, and mixtures thereof, said alkali carbonate being selected from the group consisting of a ternary lithium-potassium-sodium carbonates composition, a binary lithium-potassium carbonates composition, a binary lithium-sodium carbonates composition, a binary sodium-potassium carbonates composition and mixture thereof, said electrolyte structure being at least substantially pore-free when said electrolyte is in molten form.

As used herein, the term molten electrolyte is equivalent to liquid electrolyte. Also, by at least substantially pore-free when the electrolyte is in molten form, it is meant herein that the pores are present in a volume of about 5% or less by volume of the electrolyte structure and there is no interconnecting porosity between opposite faces of the electrolyte structure.

In carrying out the present invention, strontium titanate is used as the matrix component of the electrolyte structure. It can be composed of $SrTiO_3$, $Sr_3Ti_2O_7$ and mixtures thereof. Strontium titanate which is not stoichiometric, or which is not strontium-rich such as $Sr_3Ti_2O_7$, is not useful in the present invention because free $TiO_2$ will interact with the electrolyte to form metastable alkali titanates.

The present strontium titanate powder has an average crystallite size ranging from about 0.1 micron to about 1 micron, preferably from about 0.1 micron to about 0.7 micron, and for best results the crystallites range from about 0.3 micron to about 0.4 micron. Crystallites having an average size less than about 0.1 micron are not useful since they tend to agglomerate and prevent formation of a matrix of desired uniformity. On the other hand, crystallites having an average size larger than about 1 micron are too large to maintain the electrolyte in the structure by capillary action.

The present strontium titanate powder is composed of crystallites which are at least roughly or significantly spherical since only such morphology gives the matrix the desired uniform interstices in the electrolyte structure. For example, the strontium titanate powder can be spherical, octahedral, or cubic with at least partial truncation of edges and apices.

Preferably, the present strontium titanate powder is produced by the process disclosed in co-pending application Ser. No. 085,924 entitled "Molten Salt Synthesis of Barium And/Or Strontium Titanate Powder" filed on Oct. 18, 1979 in the name of Ronald Henry Arendt and incorporated herein by reference. This co-pending application discloses that a particulate mixture of an alkali chloride solvent salt selected from the group consisting of sodium chloride, potassium chloride and mixtures thereof, titanium oxide and strontium oxide, is heated to melt the chloride salt solvent in which the titanium oxide and strontium oxide dissolve and react precipitating strontium titanate. The resulting strontium titanate powder is composed of crystallites which can range in size up to about 1 micron and which are roughly spherical.

The present alkali carbonate is selected from the group consisting of a ternary lithium-potassium-sodium carbonates composition, a binary lithium-potassium carbonates composition, a binary lithium-sodium carbonates composition, a binary sodium-potassium carbonates composition and mixtures thereof. The particular alkali carbonates used and its particular composition depends on the type of molten carbonate fuel cell and its application.

The present electrolyte structure can be prepared by admixing from about 55% by weight to about 75% by weight of the strontium titanate powder with from about 25% by weight to about 45% by weight of the alkali carbonates, and hot pressing the resulting mixture at a temperature ranging from about 480° C. to about 490° C. under a pressure of at least about 1000 psi.

The resulting hot pressed structure is in the form of a card or plate of at least substantially uniform thickness which depends largely on the final application, and which ordinarily ranges in thickness from about 25 mils to about 250 mils.

Alternatively, in a preferred embodiment, the present electrolyte structure is prepared by forming the strontium titanate into a supporting matrix blank having a pore volume ranging from about 50% by volume to about 70% by volume of a blank and infiltrating molten carbonate electrolyte throughout the matrix blank.

The strontium titanate powder can be formed into a matrix blank using conventional ceramic processing techniques at room temperature. For example, the powder can be extruded, injection molded, die-pressed, isostatically pressed, tape cast or slip cast. Any lubricants, binders or similar materials used in forming the matrix blank should have no significant deteriorating effect on it. Also, such materials are preferably of the type which evaporate on heating at relatively low temperatures, preferably below 200° C., leaving no significant residue. If desired, the matrix blank can be fired in an atmosphere of oxygen enriched air at a temperature ordinarily ranging from about 600° C. to about 1100° C. to impart to it sufficient mechanical strength for handling.

The matrix blank in the present electrolyte structure should have a pore volume ranging from about 50% by volume to about 70% by volume of the blank. The pores in the matrix blank are interconnecting and distributed at least substantially uniformly throughout the blank. The pore volume is comprised of capillary-sized interstices between compacted particles, and for best results, the pores are submicron in size. A pore volume of ~50% of the total blank volume, corresponds to an electrolyte loading of ~32 wt % of the weight of the final electrolyte structure.

The thickness of the matrix blank in the present electrolyte structure is at least substantially uniform and depends largely on final application. Ordinarily, it ranges from about 25 mils to about 250 mils, and matrix blanks of the lowest thickness are desirable to minimize resistance loss. Usually, it is in the form of a card or plate. There is no significant difference in thickness between the matrix blank and the resulting electrolyte structure. Also, the particular size of the blank can vary depending on final application.

The molten, i.e. liquid, carbonate electrolyte can be infiltrated, i.e. impregnated, throughout the matrix blank filling the pore volume therein by a number of techniques, all of which should be carried out in an atmosphere which contains sufficient carbon dioxide, i.e. at least about $10^{-6}$ atmosphere of carbon dioxide, to maintain the molten carbonate electrolyte substantially stable. Preferably the atmosphere is carbon dioxide or air.

A preferred method of electrolyte impregnation comprises placing the matrix blank on a supporting substrate which is chemically non-interactive with the molten electrolyte. To prevent deformation of the matrix blank, the substrate supporting surface in contact with the matrix blank should be shaped, for example it can be non-uniform, to provide passages for residual gases to escape before the advancing molten electrolyte, i.e. electrolyte advancing from top to bottom of the matrix blank. An example of a suitable non-interacting substrate is an $\alpha$-$Al_2O_3$ plaque covered with a thin gold foil. A non-uniform surface for escaping gases can be imparted to the gold foil by initially wrinkling it and then straightening it out to leave "alligator skin"-type ridges in a random pattern across the entire surface. On the face of the matrix blank, i.e. the exposed surface of the matrix blank, solid electrolyte is deposited in an amount sufficient to fill the pore volume of the matrix blank and it can be, for example, in the form of a uniformly distributed loose, pre-melted and ground powder, or as a pressed plate, card or disc which rests within the boundaries of the matrix surface. The resulting assembly is heated to a temperature about 10° K. higher than the liquidus temperature of the electrolyte and the molten electrolyte is impregnated throughout the matrix blank.

Electrolyte impregnation of the matrix blank is carried out at a temperature of at least 10° K. higher than the liquidus temperature of the electrolyte, and which does not significantly vaporize the electrolyte. Preferably, it is carried out from about 50° K. to about 100° K. higher than the electrolyte liquidus temperature. Specifically, at the electrolyte liquidus temperature, the electrolyte is a relatively viscous liquid substance, but as the temperature is increased from the liquidus temperature, the electrolyte becomes less viscous and more readily flowable and such increased flowability enables a faster rate of electrolyte impregnation and equilibration throughout the capillary-sized passages and interstices of the matrix blank.

Electrolyte impregnation of the matrix blank should be carried out so that the resulting electrolyte structure is pore-free when the electrolyte is in molten form.

The completion of electrolyte impregnation depends largely on the particular electrolyte and impregnation temperature.

The resulting electrolyte structure preferably is furnace cooled to room temperature. As the electrolyte component of the structure solidifies, it contracts leaving a pore volume generally ranging from about 5% to about 15% by volume of the electrolyte structure at room temperature.

If desired, the preferred method can be carried out utilizing two impregnation steps. Specifically, for the first impregnation step, the solid electrolyte can be deposited on the exposed surface of the matrix blank in an amount sufficient to fill from about 50% to about 90% by volume of the pore volume of the matrix blank, the resulting assembly heated, and the molten electrolyte impregnated into the matrix blank. Then, for the second impregnation step, an additional amount of solid electrolyte can be deposited on the impregnated surface of the resulting impregnated matrix in an amount sufficient to fill the remainder of the pore volume therein, and the resulting assembly heated to impregnate the electrolyte throughout the matrix blank filling the pore volume therein.

The invention is further illustrated by the following examples where, unless otherwise stated, the procedure was as follows:

Strontium titanate powder was used as the supporting matrix material powder. This powder was prepared according to the process disclosed in the referenced co-pending application Ser. No. 085,924 entitled "Molten Salt Synthesis of Barium And/Or Strontium Titanate Powder" filed on Oct. 18, 1979. The strontium titanate powder was composed of crystallites which were significantly spherical and which had an average size of about 0.34 micron. X-ray analysis of the powder showed it to be composed of $SrTiO_3$ and a trace of $Sr_3Ti_2O_7$.

EXAMPLE 1

650 grams of strontium titanate powder, 162.54 grams of 99.1 weight % pure $Li_2CO_3$ and 186.94 grams of $K_2CO_3$ were dry mixed by tumbling overnight in a gallon plastic jug. The resulting mixture was heated at a rate of 120° K. per hour to a temperature of 873° K.(600° C.). The $Li_2CO_3$-$K_2CO_3$ electrolyte had a liquidus temperature of about 764° K. After one hour at 873° K., the mixture was cooled at a rate of ≦150° K. per hour to room temperature. The resulting mixture was dry milled in an $\alpha$-$Al_2O_3$ milling medium to pass $-60$ mesh. This gave material with anticipated electrolyte content $\sim$3 wt. % greater than that required to fill the strontium titanate interstitital volume as measured in the absence of electrolyte. Based on these calculations, a theoretical density of 3300 kg meter$^{-3}$ for the finished electrolyte structure was expected.

The resulting material was then hot pressed in a conventional manner at 753° K. to 758° K. under a pressure of 48.26 MPa for 15 minutes. Specifically, two hot pressed bodies, each of which was 114.3 mm in diameter and about 1.8 mm in thickness, were produced as well as one hot pressed body which was 266.7 mm square and about 1.8 mm in thickness. All of the hot pressed bodies had densities ranging from 95% to 100% of the theoretical calculated density. Approximately 81 mm square segments were cut from each of the hot pressed bodies. Three such segments were evaluated in laboratory molten carbonate fuel cells and found to give performance comparable to that achieved with the best state-of-the-art $LiAlO_2$-matrixed electrolyte structures.

EXAMPLE 2

500 grams of strontium titanate were dispersed in an absolute methanol solution containing 2.5 grams of a polyvinyl butyral resin (BUTVAR ® B74) using a blendor. The resultant homogeneous appearing fluid slurry was reduced to dryness using infrared heating and constant stirring. Drying was continued until a dispersible powder resulted but before complete methanol removal.

The resulting mixture was pressed in a steel die press under a pressure of about 3000 psi to produce several rectangular matrix blanks, each of which was 165.1 mm×76.2 mm×$\sim$2.5 mm. Each blank was then cut in half producing blanks or cards, i.e. $\sim$82.55 mm×76.2 mm×$\sim$2.5 mm, for laboratory cell evaluation. In addition, 3 discs, each 12.7 mm in diameter and 1.8 mm in thickness, were also pressed in the same manner.

The matrix blanks, i.e. cards and discs, were placed on a platinum substrate and heated in an oxygen enriched air atmosphere at a rate of about 100° K. per hour to 1263° K. (about 990° C.). After 1.5 hours at 1263° K., the bodies were furnace cooled to room temperature.

Formation of bonds between the crystallites mechanically strengthened the resulting lightly sintered matrix blanks, i.e. cards and discs, which had sufficient strength for handling. The void volume of the lightly sintered bodies was about 50% compared with an unsintered value of about 56%. The void volume of the lightly sintered bodies was used to calculate the mass of 62 mole % $Li_2CO_3$-38 mole % $K_2CO_3$, required to fill the interstitial volume of the lightly sintered matrix blanks at 923° K. The pores in the sintered blanks were interconnecting and distributed uniformly throughout the blank and were substantially submicron in size.

Each blank was placed on a chemically non-interacting, gas permeable substrate comprised of a card of low density ($\sim$60%) $\alpha$-$Al_2O_3$ plaque covered with a piece of 0.002" thick wrinkled gold foil. Each blank was placed on the gold foil, and the required amount of 62 mole % $Li_2CO_3$-38 mole % $K_2 CO_3$, which had a liquidus temperature of about 764° K., was mounded on the face of each matrix blank. The resulting assemblies were heated in an atmosphere of air at a rate of about 100° K. per hour to 873° K. During this period, the electrolyte was observed to melt and the resultant liquid rapidly and uniformly, impregnate the matrix blanks. The complete electrolyte structures were then furnace cooled to room temperature. Each of the final products was an integral planar, uniform thickness body of apparently homogeneous composition, similar to the electrolyte structures prepared in Example 1. Each final product had a thickness of $\sim$2.5 mm.

The following copending U.S. patent applications are assigned to the assignee hereof and are incorporated herein by reference:

Ser. No. 14,230 filed Feb. 23, 1979 in the names of R. H. Arendt and M. J. Curran entitled "Electrolyte Structure for Molten Carbonate Fuel Cells" discloses an electrolyte structure produced by forming matrix material powder into a blank at room temperature and impregnating the resulting matrix blank with molten electrolyte. This application also discloses that the matrix material powder should be chemically inert under fuel cell operating conditions, that it should be at least substantially chemically inert toward the electrolyte, electrode materials, and reactant and product gases, and specifically discloses $LiAlO_2$ as a support material.

What is claimed is:

1. A process for producing an electrolyte structure for a molten carbonate fuel cell which comprises admixing from about 55% by weight to about 75% by weight of strontium titanate powder with from about 25% by weight to about 45% by weight of electrolyte based on the total weight of the mixture, and hot pressing the resulting mixture at a temperature ranging from about 480° C. to about 490° C. under a pressure of at least about 1000 psi, said strontium titanate being composed of crystallites which are at least significantly spherical and which have an average size ranging from about 0.1 micron to about 1 micron, said strontium titanate being selected from the group consisting of stoichiometric strontium titanate, strontium-rich titanate and mixtures thereof, said electrolyte being selected from the group consisting of a ternary lithium-potassium-sodium carbonates composition, a binary lithium-potassium carbonates composition, a binary lithium-sodium carbonates composition, a binary sodium-potassium carbonates composition and mixtures thereof, said electrolyte structure being at least substantially pore-free when said electrolyte is in molten form.

2. A process for producing an electrolyte structure for a molten carbonate fuel cell, said electrolyte structure consisting essentially of electrolyte and strontium titanate supporting matrix, which comprises providing strontium titanate powder wherein the crystallites are at least significantly spherical and have an average size ranging from about 0.1 micron to about 1 micron, forming said strontium titanate powder into a supporting matrix blank wherein the pore volume is interconnecting and comprised of capillary-sized interstices between compacted crystallites and is at least substantially uniformly distributed and ranges from about 50% by volume to about 70% by volume of said blank, placing said strontium titanate blank on a surface of a supporting substrate, depositing solid electrolyte on the face of said strontium titanate blank in an amount sufficient when molten to fill the pore volume of said blank, said strontium titanate being selected from the group consisting of stoichiometric strontium titanate, strontium-rich titanate and mixtures thereof, said electrolyte being an alkali carbonate composition selected from the group consisting of a ternary lithium-potassium-sodium carbonates composition, a binary lithium-potassium carbonates composition, a binary lithium-sodium carbonates composition, a binary sodium-potassium carbonates composition and mixtures thereof, heating the resulting assembly to a temperature at least about 10° K. above the liquidus temperature of said electrolyte but at which it does not significantly vaporize whereupon the resulting molten electrolyte impregnates the blank advancing throughout the blank filling the pore volume therein so that the resulting electrolyte structure is at least substantially pore free when the electrolyte is in molten form, said heating being carried out in an atmosphere containing sufficient carbon dioxide to maintain the stability of said molten electrolyte, said substrate being chemically non-interactive with said molten electrolyte, said supporting substrate surface being shaped to allow residual gases to escape advancing molten electrolyte.

3. A process for producing an electrolyte structure consisting essentially of electrolyte and strontium titanate supporting matrix for a molten carbonate fuel cell which comprises providing strontium titanate powder wherein the crystallites are at least significantly spherical and have an average size ranging from about 0.1 micron to about 1 micron, forming said strontium titanate powder into a supporting matrix blank wherein the pore volume is interconnecting and comprised of capillary-sized interstices between compacted crystallites and is at least substantially uniformly distributed and ranges from about 50% by volume to about 70% by volume of said blank, placing said strontium titanate blank on a surface of a supporting substrate, depositing solid electrolyte on the face of said strontium titanate blank in an amount sufficient to fill from about 50% by volume to about 90% by volume of the pore volume of the matrix blank, said strontium titanate being selected from the group consisting of stoichiometric strontium titanate, strontium-rich titanate and mixtures thereof, said electrolyte being an alkali carbonate composition selected from the group consisting of a ternary lithium-potassium-sodium carbonates composition, a binary lithium-potassium carbonates composition, a binary lithium-sodium carbonates composition, a binary sodium-potassium carbonates composition and mixtures thereof, heating the resulting assembly to a temperature at least about 10° K. above the liquidus temperature of said electrolyte but at which it does not significantly vaporize whereupon the resulting molten electrolyte impregnates the matrix blank, depositing additional solid electrolyte on the impregnated surface of the resulting impregnated matrix in an amount sufficient when molten to fill the remainder of the pore volume of said impregnated matrix, heating the resulting assembly to said temperature whereupon the resulting additional molten electrolyte impregnates said matrix blank filling the pore volume therein so that the resulting electrolyte structure is at least substantially pore free when the electrolyte is in molten form, said heating being carried out in an atmosphere containing sufficient carbon dioxide to maintain the stability of said molten electrolyte, said substrate being chemically non-interactive with said molten electrolyte, said supporting substrate surface being shaped to allow residual gases to escape the advancing molten electrolyte.

* * * * *